United States Patent
Thyagarajan

(10) Patent No.: US 6,996,283 B2
(45) Date of Patent: Feb. 7, 2006

(54) BLOCK SIZE ASSIGNMENT USING LOCAL CONTRAST RATIO

(75) Inventor: Kadayam Thyagarajan, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 439 days.

(21) Appl. No.: 10/298,030

(22) Filed: Nov. 15, 2002

(65) Prior Publication Data

US 2004/0096111 A1 May 20, 2004

Related U.S. Application Data

(60) Provisional application No. 60/322,488, filed on Nov. 16, 2001.

(51) Int. Cl.
*G06K 9/36* (2006.01)
*H04N 1/415* (2006.01)

(52) U.S. Cl. .................. 382/239; 382/240; 358/433
(58) Field of Classification Search ................ 382/239, 382/240, 248, 232, 253; 358/433, 261.2, 358/426.14; 375/240.02, 240.11, 240.2, 240.24
See application file for complete search history.

(56) References Cited

U.S. PATENT DOCUMENTS

| | | | | |
|---|---|---|---|---|
| 5,065,446 A | * | 11/1991 | Suzuki et al. ............... | 382/253 |
| 5,107,345 A | * | 4/1992 | Lee ............................. | 382/250 |
| 5,241,395 A | * | 8/1993 | Chen .......................... | 358/426.14 |
| 5,452,104 A | * | 9/1995 | Lee ............................. | 358/426.14 |
| 5,455,680 A | * | 10/1995 | Shin ........................... | 382/239 |
| 5,471,248 A | * | 11/1995 | Bhargava et al. .......... | 375/240.24 |
| 5,585,944 A | * | 12/1996 | Rodriguez .................. | 358/500 |
| 5,724,451 A | * | 3/1998 | Shin et al. .................. | 382/240 |
| 5,903,669 A | * | 5/1999 | Hirabayashi ............... | 382/232 |
| 6,529,634 B1 | * | 3/2003 | Thyagarajan et al. ..... | 382/239 |
| 6,600,836 B1 | * | 7/2003 | Thyagarajan et al. ..... | 382/239 |
| 2002/0106129 A1 | * | 8/2002 | Yadid-Pecht ............... | 382/232 |

OTHER PUBLICATIONS

"Adaptive block–size transform coding for image compression," Javier Bracamonte et al., 1997 IEEE International Conference oAcoustics, Speech, and Signal Processing, 1997, ICASSP–97, vol. 4, 1997, pp. 2721–2724.*

Vaisey J. et al., "Image Compression With Variable Block Size Segmentation", IEEE Transactions On Signal Processesing, vol. 40, No. 8, Aug. 1, 1992, pp. 2040–2060.*

Chen R. et al., "A Fully Adaptive DCT Based Color Image Sequence Coder" Signal Processing. Image Communication, NL, Elsevier Science Publishers, vol. 6, No. 4, Aug. 1, 1994, pp. 289–301. □□.*

* cited by examiner

*Primary Examiner*—Wenpeng Chen
(74) *Attorney, Agent, or Firm*—Phil Wadsworth; Sandip (Micky) Minhas; Abdollah Katbab

(57) ABSTRACT

An apparatus and method for determining a block size assignment for a block of pixels is claimed. A mean for a given block of pixels and a neighborhood mean for adjacent blocks of pixels is determined. A contrast ratio is then determined, as a function of the mean and the neighborhood mean. A variance threshold is determined as a function of the contrast ratio. Then, various sub-block sizes within the block of pixels is determined as a function of the variance threshold. As such, a pixel block is considered in the context of adjacent pixel blocks rather than in isolation, which narrows the spread of block variances and allows for a more robust subdivision of pixel blocks.

23 Claims, 3 Drawing Sheets

PQR DATA

BLOCK SIZE ASSIGNMENT USING LOCAL CONTRAST RATIO

CROSS-REFERENCE TO RELATED APPLICATION

This application claims the benefit of U.S. Provisional Patent Application Ser. No. 60/322,488, filed Nov. 16, 2001, pending, which application is incorporated herein by reference in its entirety.

BACKGROUND OF THE INVENTION

I. Field of the Invention

The present invention relates to image processing. More specifically, the present invention relates to a compression scheme utilizing adaptively sized blocks of pixels based on the local contrast ratio.

II. Description of the Related Art

In the field of transmission and reception of video signals such as are used for projecting "films" or "movies", various improvements are being made to image compression techniques. Many of the current and proposed video systems make use of digital encoding techniques. Digital encoding provides a robustness for the communications link which resists impairments such as multipath fading and jamming or signal interference, each of which could otherwise serious degrade image quality. Furthermore, digital techniques facilitate the use signal encryption techniques, which are found useful or even necessary for governmental and many newly developing commercial broadcast applications.

High definition video is an area that benefits from improved image compression techniques. When first proposed, over-the-air transmission of high definition video (or even over-wire or fiber-optical transmission) seemed impractical due to excessive bandwidth requirements. Typical wireless, or other, transmission systems being designed did not readily accommodate enough bandwidth. However, it has been realized that compression of digital video signals may be achieved to a level that enables transmission using reasonable bandwidths. Such levels of signal compression, coupled with digital transmission of the signal, will enable a video system to transmit with less power with greater immunity to channel impairments while occupying a more desirable and useful bandwidth.

One compression technique capable of offering significant levels of compression while preserving the desired level of quality for video signals utilizes adaptively sized blocks and sub-blocks of encoded Discrete Cosine Transform (DCT) coefficient data. This technique will hereinafter be referred to as the Adaptive Block Size Differential Cosine Transform (ABSDCT) method. This technique is disclosed in U.S. Pat. No. 5,021,891, entitled "Adaptive Block Size Image Compression Method And System," assigned to the assignee of the present invention and incorporated herein by reference. DCT techniques are also disclosed in U.S. Pat. No. 5,107,345, entitled "Adaptive Block Size Image Compression Method And System," assigned to the assignee of the present invention and incorporated herein by reference. Further, the use of the ABSDCT technique in combination with a Differential Quadtree Transform technique is discussed in U.S. Pat. No. 5,452,104, entitled "Adaptive Block Size Image Compression Method And System," also assigned to the assignee of the present invention and incorporated herein by reference. The systems disclosed in these patents utilizes what is referred to as "intraframe" encoding, where each frame of image data is encoded without regard to the content of any other frame. Using the ABSDCT technique, the achievable data rate may be reduced from around 1.5 billion bits per second to approximately 50 million bits per second without discernible degradation of the image quality.

The ABSDCT technique may be used to compress either a black and white or a color image or signal representing the image. The color input signal may be in a YIQ format, with Y being the luminance, or brightness, sample, and I and Q being the chrominance, or color, samples for each 4×4 block of pixels. Other known formats such as the YUV or RGB formats may also be used. Because of the low spatial sensitivity of the eye to color, most research has shown that a sub-sample of the color components by a factor of four in the horizontal and vertical directions is reasonable. Accordingly, a video signal may be represented by four luminance components and two chrominance components.

Using ABSDCT, a video signal will generally be segmented into blocks of pixels for processing. For each block, the luminance and chrominance components are passed to a block interleaver. For example, a 16×16 (pixel) block may be presented to the block interleaver, which orders or organizes the image samples within each 16×16 block to produce blocks and composite sub-blocks of data for discrete cosine transform (DCT) analysis. The DCT operator is one method of converting a time-sampled signal to a frequency representation of the same signal. By converting to a frequency representation, the DCT techniques have been shown to allow for very high levels of compression, as quantizers can be designed to take advantage of the frequency distribution characteristics of an image. In a preferred embodiment, one 16×16 DCT is applied to a first ordering, four 8×8 DCTs are applied to a second ordering, 16 4×4 DCTs are applied to a third ordering, and 64 2×2 DCTs are applied to a fourth ordering.

The DCT operation reduces the spatial redundancy inherent in the video source. After the DCT is performed, most of the video signal energy tends to be concentrated in a few DCT coefficients. An additional transform, the Differential Quad-Tree Transform (DQT), may be used to reduce the redundancy among the DCT coefficients.

For the 16×16 block and each sub-block, the DCT coefficient values and the DQT value (if the DQT is used) are analyzed to determine the number of bits required to encode the block or sub-block. Determination as to whether to subdivide a given block is typically done by evaluating the variance within the block. Then, the block or the combination of sub-blocks that requires the least number of bits to encode is chosen to represent the image segment. For example, two 8×8 sub-blocks, six 4×4 sub-blocks, and eight 2×2 sub-blocks may be chosen to represent the image segment.

The chosen block or combination of sub-blocks is then properly arranged in order into a 16×16 block. The DCT/DQT coefficient values may then undergo frequency weighting, quantization, and coding (such as variable length coding) in preparation for transmission.

Although the ABSDCT technique described above performs remarkably well, the block size is determined without regard to its surroundings. Since the block variance may have a very large spread, block size assignment becomes very image dependant and accordingly, requires frequent adjustment of thresholds. Human vision, however, does not take place in such isolation. Thus, it is desirable to consider a pixel block in the context of more than the given pixel block and to give consideration to the pixel blocks surroundings.

SUMMARY OF THE INVENTION

The present invention does evaluate a pixel block in the context of the pixel blocks's surroundings. That is, a given pixel block is considered in the context of its adjacent pixel blocks, or neighborhood. As such, determination of the block size assignment is able to be performed in a uniform fashion independent of image types. Because the human visual system is more contrast sensitive, the local contrast ratio is used as a criterion for subdividing. Thus, utilization of neighborhood properties narrows the spread of block variance and makes block subdivision more robust.

Thus, embodiments of the invention describe an apparatus and method for determining a block size assignment for a block of data representing pixels. A mean for a given block and a neighborhood mean for neighborhood blocks is determined. A local contrast ratio is then determined, as a function of the mean and the neighborhood mean. A variance threshold is determined as a function of the local contrast ratio. Then, various sub-block sizes within the block are determined as a function of the variance threshold. As such, a pixel block is considered in the context of neighboring blocks rather than in isolation, which narrows the spread of block variances and thereby allows for a more robust subdivision of pixel blocks.

The block size assignment is provided to a transform element, which transforms the pixel data into frequency domain data. The transform is performed only on the block and sub-blocks selected through block size assignment. The transform data then undergoes quantization and serialization. For example, zigzag scanning may be utilized to serialize the data to produce a stream of data. The stream of data may then be coded by a variable length coder in preparation for transmission. The encoded data is sent through a transmission channel to a decoder, where the pixel data is reconstructed in preparation for display.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
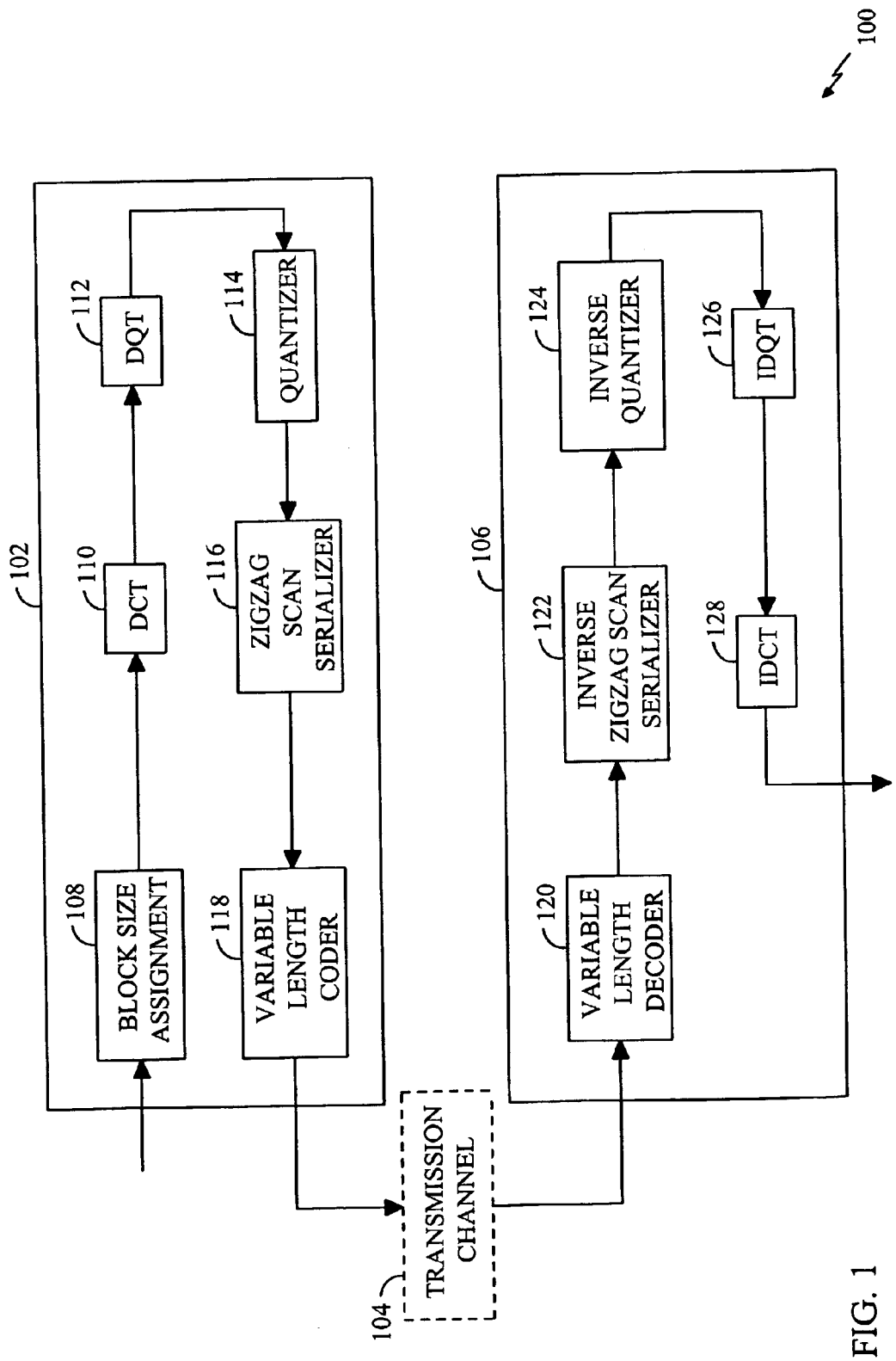
FIG. 1 is a block diagram of an image processing system that incorporates the variance based block size assignment system and method of the present invention.

In order to facilitate digital transmission of digital signals and enjoy the corresponding benefits, it is generally necessary to employ some form of signal compression. To achieve high definition in a resulting image, it is also important that the high quality of the image be maintained. Furthermore, computational efficiency is desired for compact hardware implementation, which is important in many applications.

Embodiment of the invention provide an apparatus and method of image compression that takes into account both the image quality and computational efficiency in performing image compression. The image compression is based on discrete cosine transform (DCT) techniques. An image to be processed in the digital domain is composed of pixel data divided into an array of non-overlapping blocks, N×N in size. A two-dimensional DCT may be performed on each block. The two-dimensional DCT is defined by the following relationship:

$$X(k,l) = \frac{\alpha(k)\beta(l)}{N} \sum_{m=0}^{N-1} \sum_{n=0}^{N-1} x(m,n) \cos\left[\frac{(2m+1)\pi k}{2N}\right] \cos\left[\frac{(2n+1)\pi l}{2N}\right],$$

$$0 \le k, l \le N-1$$

$$\text{where } \alpha(k), \beta(k) = \begin{cases} 1, & \text{if } k=0 \\ \sqrt{2}, & \text{if } k \ne 0 \end{cases}, \text{ and}$$

x(m,n) is the pixel location (m,n) within an N×M block, and

X(k,l) is the corresponding DCT coefficient.

Since pixel values are non-negative, the DCT component X(0,0) is always positive and usually has the most energy. In fact, for typical images, most of the transform energy is concentrated around the component X(0,0). This energy compaction property makes the DCT technique such an attractive compression method.

The image compression technique of the present invention utilizes a local contrast ratio to achieve further bit rate reduction. It has been observed that most natural images are made up of flat relatively slow varying areas, and busy areas such as object boundaries and high-contrast texture. Contrast adaptive coding schemes take advantage of this factor by assigning more bits to the busy areas and less bits to the less busy areas. Using a local contrast ratio further emphasizes areas to which the human visual system is more sensitive.

Use of a local contrast ratio is also useful for reducing the blocking effect. In the implementation of other DCT coding techniques, the blocking effect is perhaps the most important impairment to image quality. Furthermore, the blocking effect tends to be more perceptible in busy areas of the image. However, it has been realized that the blocking effect is reduced when a smaller sized DCT is used. The blocking effect becomes virtually invisible when a 2×2 DCT is used, although the bit per pixel performance may suffer. Thus, use of a local contrast ratio may reduce the blocking effect by assigning smaller block sizes (and thereby more bits) to the busy areas and larger block sizes to the relatively blank areas. Further, use of a local contrast ratio decreases the so called mosquito effect. The mosquito effect refers to spill over or "bleeding", in borderline areas of high contrast. For example, if a dark shirt were next to a bright background, blocks representing the edge of the dark shirt may spill over or "bleed" into the bright background. This occurs when block sizes are too large (such as 16×16) to accommodate such high contrast.

For image processing purposes, the DCT operation is performed on pixel data that is divided into an array of non-overlapping blocks. Note that although block sizes are discussed herein as being N×N in size, it is envisioned that various block sizes may be used. For example, a N×M block size may be utilized where both N and M are integers with M being either greater than or less than N. Another important aspect is that the block is divisible into at least one level of sub-blocks, such as N/i×N/i, N/i×N/j, N/i×M/j, and etc. where i and j are integers. Furthermore, the exemplary block size as discussed herein is a 16×16 pixel block with corresponding block and sub-blocks of DCT coefficients. It is further envisioned that various other integers such as both even or odd integer values may be used, e.g. 9×9.

Referring now to FIG. 1, an image processing system 100 which incorporates the compression system of the present invention is shown. The image processing system 100 comprises an encoder 102 that compresses a received video signal. The compressed signal is transmitted through a transmission channel 104, and received by a decoder 106. The decoder 106 decodes the received signal into image samples, which may then be displayed.

In general, an image is divided into blocks of pixels for processing. A color signal may be converted from RGB space to $YC_1C_2$ space, with Y being the luminance, or brightness, component, and $C_1$ and $C_2$ being the chrominance, or color, components. Because of the low spatial sensitivity of the eye to color, many systems sub-sample the $C_1$ and $C_2$ components by a factor of four in the horizontal and vertical directions. However, the sub-sampling is not necessary. A full resolution image, known as 4:4:4 format, may be either very useful or necessary in some applications such as those referred to as covering "digital cinema." Two possible $YC_1C_2$ representations are, the YIQ representation and the YUV representation, both of which are well known in the art. It is also possible to employ a variation of the YUV representation known as YCbCr (Y is the luminance component, and Cb and Cr are the chrominance components).

In a preferred embodiment, each of the Y, Cb, and Cr components is processed without sub-sampling. Thus, an input of a 16×16 block of pixels is provided to the encoder 102. The encoder 102 comprises a block size assignment element 108, which performs block size assignment in preparation for video compression. The block size assignment element 108 determines the block decomposition of the 16×16 block based on the perceptual characteristics of the image in the block, and utilizes a local contrast ratio by considering variances of not only the block under evaluation, but also neighboring blocks. Block size assignment subdivides each 16×16 block into smaller blocks in a quad-tree fashion. The block size assignment element 108 generates a quad-tree data, called the PQR data, whose length can be between 1 and 21 bits (see FIG. 3). Thus, if block size assignment determines that a 16×16 block is to be divided, the R bit of the PQR data is set and is followed by four additional bits of P data corresponding to the four divided 8×8 blocks. If block size assignment determines that any of the 8×8 blocks is to be subdivided, then four additional bits of Q data for each 8×8 block subdivided are added. The manner in which the block size assignment determines whether and to what degree blocks need to be divided and subdivided is discussed in the description relating to FIG. 2.

Figure 2A:
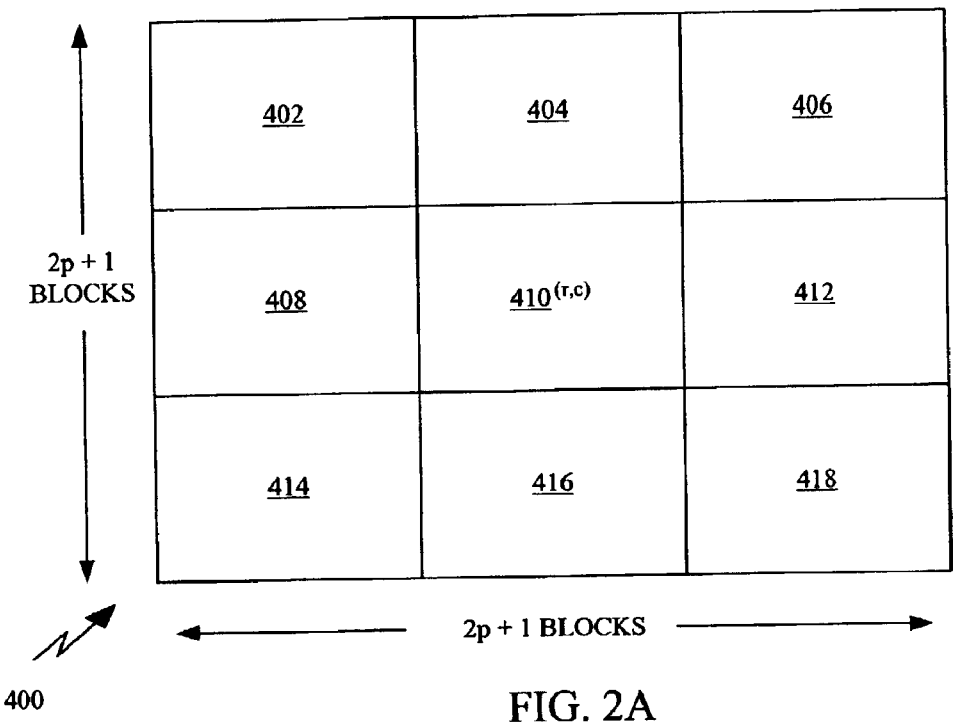
FIG. 2a illustrates an exemplary group of blocks of pixels.

FIG. 2a illustrates illustrates an N×N block of pixels 400. Consider evaluation of block 410. The neighborhood size is then (2p+1)×(2p+1) blocks. Thus, determination of the local contrast ratio for block 410 (r,c) considers the contrast in its neighboring blocks, blocks 402, 404, 406, 408, 412, 414, 416, and 418. If the block being evaluated is a corner block, such as block 402, then its neighbors comprise blocks 404, 410, and 408. For a block on the edge but not a corner, such as block 412, its neighbors comprise blocks 406, 404, 410, 416, and 418.

Figure 2B:
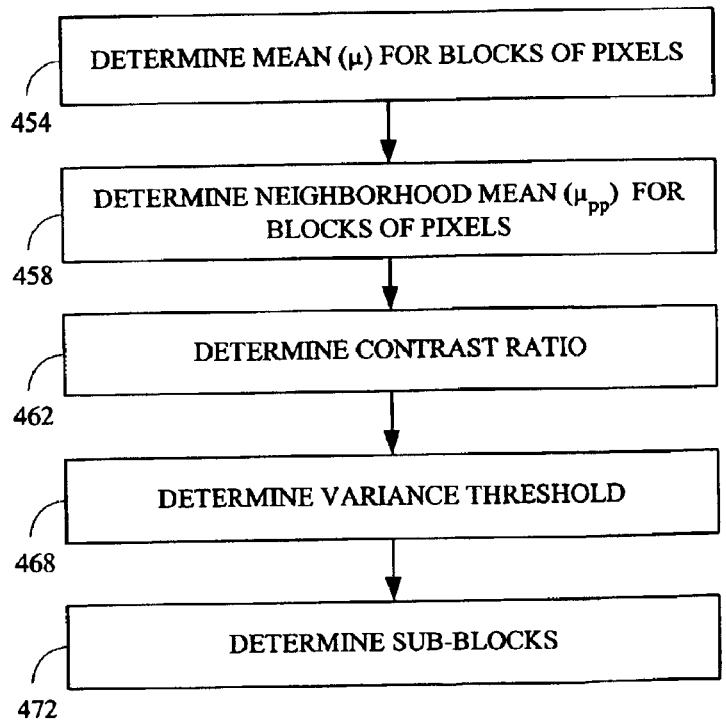
FIG. 2b illustrates a flow diagram of the process of determining the variance of a block of pixels including neighborhood properties.

FIG. 2b illustrates the process 450 to determine the local contrast ratio. Such a process may be embodied in a processor, such as illustrated in block size element 108 in FIG. 1, or software running on a processor, or other embodiments. The mean ($\mu$) of a given block is determined 454. In an embodiment, the mean is determined using the following relationship:

$$\mu_{rc} = \frac{1}{N^2} \sum_i \sum_j x_{i,j}$$

where $\mu_{rc}$ is the mean of the given block, N represents the dimension of the block of pixels, and i,j is the pixel in the $i^{th}$ row and $j^{th}$ column in the N×N block of pixels.

The neighborhood mean ($\mu_{pp}$) is also determined 458. In an embodiment, the neighborhood mean is determined using the following relationship:

$$\mu_{pp} = \frac{1}{((2p+1) \times (2p+1) - 1)} \left[ \sum_{k=-p}^{p} \sum_{l=-p, k+l \neq 0}^{p} \mu_{k,l} \right]$$

where p is the number of rows and columns defining the neighborhood and $\mu_{k,l}$ is the mean of the k,$l^{th}$ block in the neighborhood. In a preferred embodiment, p is one.

Then, the contrast ratio is then determined 462. In an embodiment, the contrast ratio is determined by the following relationship:

$$c\_ratio = \frac{|\mu_{rc} - \mu_{pp}|}{\mu_{pp}}$$

where $\mu_{rc}$ denotes the mean of the center block and $\mu_{pp}$ denotes the mean of the remaining blocks in the neighborhood.

Thus, by using the local contrast ratio, a block with a low contrast ratio will be situated in a flat region (either dark or light) while a block with a high contrast ratio will be either dark in a bright background or bright in a dark background. Accordingly, the essence of the block that is humanly perceptible is captured while minimizing the bit needed to represent such.

Once the local contrast ratio is determined, the variance threshold corresponding to the contrast ratio is determined 468. Thus, if the local contrast ratio falls within a given range, a particular variance threshold is assigned. Upon determining the variance threshold corresponding to a given contrast ratio, the block size assignment is determined 472.

Figure 3A:
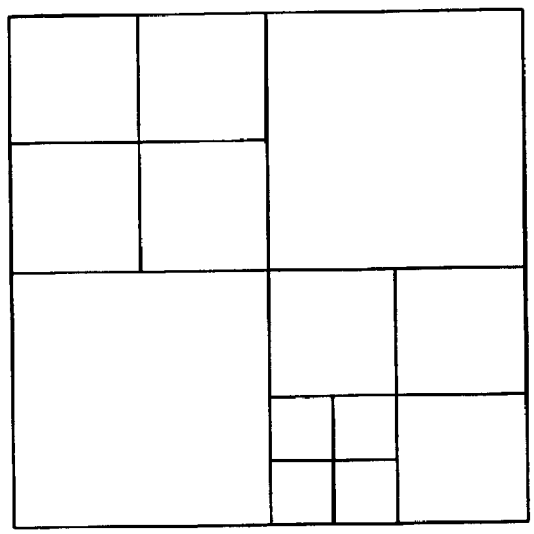
FIGS. 3a, 3b, and 3c illustrate an exemplary block size assignment, the corresponding quad-tree decomposition, and the corresponding PQR data.
Figure 3B:
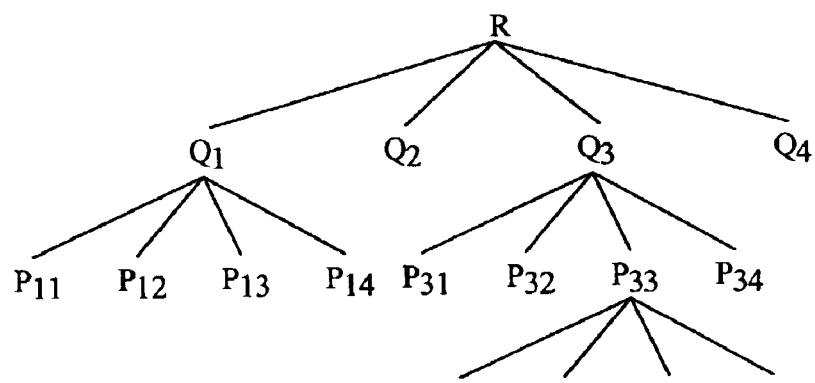
Figure 3C:
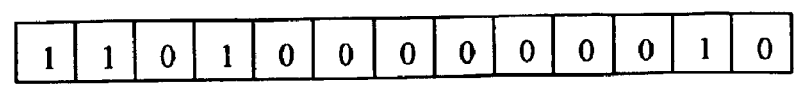

The resulting block size assignment is shown in FIG. 3a. The corresponding quad-tree decomposition is shown in FIG. 3b. Additionally, the PQR data generated by this block size assignment is shown in FIG. 3c.

Note that a similar procedure is used to assign block sizes for the color components $C_1$ and $C_2$. The color components may be decimated horizontally, vertically, or both.

Referring back to FIG. 1, the remainder of the image processing system 110 will be described. The PQR data, along with the addresses of the selected blocks, are provided to a DCT element 110. The DCT element 110 uses the PQR data to perform discrete cosine transforms of the appropriate sizes on the selected blocks. Only the selected blocks need to undergo DCT processing.

The image processing system 100 may optionally comprise DQT element 112 for reducing the redundancy among the DC coefficients of the DCTs. A DC coefficient is encountered at the top left corner of each DCT block. The DC coefficients are, in general, large compared to the AC coefficients. The discrepancy in sizes makes it difficult to design an efficient variable length coder. Accordingly, it is advantageous to reduce the redundancy among the DC coefficients.

The DQT element 112 performs 2-D DCTs on the DC coefficients, taken 2×2 at a time. Starting with 2×2 blocks within 4×4 blocks, a 2-D DCT is performed on the four DC coefficients. This 2×2 DCT is called the differential quad-tree transform, or DQT, of the four DC coefficients. Next, the DC coefficient of the DQT along with the three neighboring DC coefficients with an 8×8 block are used to compute the next level DQT. Finally, the DC coefficients of the four 8×8 blocks within a 16×16 block are used to compute the DQT. Thus, in a 16×16 block, there is one true DC coefficient and the rest are AC coefficients corresponding to the DCT and DQT.

The transform coefficients (both DCT and DQT) are provided to a quantizer 114 for quantization. In a preferred embodiment, the DCT coefficients are quantized using frequency weighting masks (FWMs) and a quantization scale factor. A FWM is a table of frequency weights of the same dimensions as the block of input DCT coefficients. The frequency weights apply different weights to the different DCT coefficients. The weights are designed to emphasize the input samples having frequency content that the human visual system is more sensitive to, and to de-emphasize samples having frequency content that the visual system is less sensitive to.

The weights may also be designed based on factors such as viewing distances, etc.

The weights are selected based on empirical data. A method for designing the weighting masks for 8×8 DCT coefficients is disclosed in ISO/IEC JTCI CD 10918, "Digital compression and encoding of continuous-tone still images—part 1: Requirements and guidelines," International Standards Organization, 1994, which is herein incorporated by reference. In general, two FWMs are designed, one for the luminance component and one for the chrominance components. The FWM tables for block sizes 2×2, 4×4 are obtained by decimation and 16×16 by interpolation of that for the 8×8 block. The scale factor controls the quality and bit rate of the quantized coefficients.

Thus, each DCT coefficient is quantized according to the relationship:

$$DCT_q(i, j) = \left\lfloor \frac{8*DCT(i, j)}{fwm(i, j)*q} \pm \frac{1}{2} \right\rfloor$$

where DCT(i,j) is the input DCT coefficient, fwm(i,j) is the frequency weighting mask, q is the scale factor, and DCTq(i,j) is the quantized coefficient. Note that depending on the sign of the DCT coefficient, the first term inside the braces is rounded up or down. The DQT coefficients are also quantized using a suitable weighting mask. However, multiple tables or masks can be used, and applied to each of the Y, Cb, and Cr componenets.

The quantized coefficients are provided to a zigzag scan serializer 116. The serializer 116 scans the blocks of quantized coefficients in a zigzag fashion to produce a serialized stream of quantized coefficients. A number of different zigzag scanning patterns, as well as patterns other than zigzag may also be chosen. A preferred technique employs 8×8 block sizes for the zigzag scanning, although other sizes may be employed.

Note that the zigzag scan serializer 116 may be placed either before or after the quantizer 114. The net results are the same.

In any case, the stream of quantized coefficients is provided to a variable length coder 118. The variable length coder 118 may make use of run-length encoding of zeros followed by Huffman encoding. This technique is discussed in detail in aforementioned U.S. Pat. Nos. 5,021,891, 5,107, 345, and 5,452,104, and is summarized herein. A run-length coder would take the quantized coefficients and separate out the zero from the non-zero coefficients. The zero values are referred to as run-length values, and are Huffman encoded. The non-zero values are separately Huffman encoded.

A modified Huffman coding of the quantized coefficients is also possible and is used in the preferred embodiment. Here, after zigzag scanning, a run-length coder will determine the run-length/size pairs within each 8×8 block. These run-length/size pairs are then Huffman encoded.

Huffman codes are designed from either the measured or theoretical statistics of an image. It has been observed that most natural images are made up of blank or relatively slowly varying areas, and busy areas such as object boundaries and high-contrast texture. Huffman coders with frequency-domain transforms such as the DCT exploit these features by assigning more bits to the busy areas and fewer bits to the blank areas. In general, Huffman coders make use of look-up tables to code the run-length and the non-zero values. Multiple tables are generally used, with 3 tables being preferred in the present invention, although 1 or 2 can be employed, as desired.

The compressed image signal generated by the encoder 102 are transmitted to the decoder 106 via the transmission channel 104. The PQR data, which contains the block size assignment information, is also provided to the decoder 106. The decoder 106 comprises a variable length decoder 120, which decodes the run-length values and the non-zero values.

The output of the variable length decoder 120 is provided to an inverse zigzag scan serializer 122 that orders the coefficients according to the scan scheme employed. The inverse zigzag scan serializer 122 receives the PQR data to assist in proper ordering of the coefficients into a composite coefficient block.

The composite block is provided to an inverse quantizer 124, for undoing the processing due to the use of the frequency weighting masks.

The coefficient block is then provided to an IDQT element 126, followed by an IDCT element 128, if the Differential Quad-tree transform had been applied. Otherwise, the coefficient block is provided directly to the IDCT element 128. The IDQT element 126 and the IDCT element 128 inverse transform the coefficients to produce a block of pixel data. The pixel data may be then have to be interpolated, converted to RGB form, and then stored for future display.

Thus, a novel and improved method and apparatus for determining block size assignments have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a subscriber unit. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What we claim as our invention is:

1. A method of determining a block size assignment for a given block of pixels, the method comprising:
   determining a mean for the given block of pixels;
   determining a neighborhood mean for given blocks of pixels;
   determining a contrast ratio as a function of the mean and the neighborhood mean;
   determining a variance threshold as a function of the contrast ratio; and
   determining sub-block sizes within the block of pixels as a function of the variance threshold.

2. The method set forth in claim 1, wherein the neighborhood mean comprises determining a mean of blocks of pixels adjacent to the given block of pixels.

3. The method set forth in claim 1, wherein determining the neighborhood mean is determined by the following relationship:

$$\mu_{pp} = \frac{1}{((2p+1)\times(2p+1)-1)} \left[ \sum_{k=-p}^{p} \sum_{l=-p, k\neq l\neq 0}^{p} \mu_{k,l} \right]$$

where p is the row and column and $\mu_{k,l}$ is the mean of the k,l$^{th}$ block in the neighborhood.

4. The method set forth in claim 1, wherein determining the contrast ratio is determined by the following relationship:

$$c\_ratio = \frac{|\mu_{rc} - \mu_{pp}|}{\mu_{pp}}$$

where $\mu_{rc}$ is the mean of the given block and $\mu_{pp}$ is the mean of the remaining blocks in the neighborhood.

5. An apparatus for determining a block size assignment for a given block of pixels, the apparatus comprising:
   means for determining a mean for the given block of pixels;
   means for determining a neighborhood mean for given blocks of pixels;
   means for determining a contrast ratio as a function of the mean and the neighborhood mean;
   means for determining a variance threshold as a function of the contrast ratio; and
   means for determining sub-block sizes within the block of pixels as a function of the variance threshold.

6. The apparatus set forth in claim 5, wherein the neighborhood mean comprises means for determining a mean of blocks of pixels adjacent to the given block of pixels.

7. The apparatus set forth in claim 5, wherein the means for determining the neighborhood mean is determined by the following relationship:

$$\mu_{pp} = \frac{1}{((2p+1)\times(2p+1)-1)} \left[ \sum_{k=-p}^{p} \sum_{l=-p, k\neq l\neq 0}^{p} \mu_{k,l} \right]$$

where p is the row and column and $\mu_{k,l}$ is the mean of the k,l$^{th}$ block in the neighborhood.

8. The apparatus set forth in claim 5, wherein the means for determining the contrast ratio is determined by the following relationship:

$$c\_ratio = \frac{|\mu_{rc} - \mu_{pp}|}{\mu_{pp}}$$

where $\mu_{rc}$ is the mean of the given block and $\mu_{pp}$ is the mean of the remaining blocks in the neighborhood.

9. A computer readable medium containing instructions to perform a method for determining a block size assignment for a given block of pixels, the method comprising:
   determining a mean for the given block of pixels;
   determining a neighborhood mean for blocks of pixels;
   determining a contrast ratio as a function of the mean and the neighborhood mean;
   determining a variance threshold as a function of the contrast ratio; and
   determining sub-block sizes within the block of pixels as a function of the variance threshold.

10. The computer readable medium set forth in claim 9, wherein the neighborhood mean comprises determining a mean of blocks of pixels adjacent to the given block of pixels.

11. The computer readable medium set forth in claim 9, wherein determining the neighborhood mean is determined by the following relationship:

$$\mu_{pp} = \frac{1}{((2p+1)\times(2p+1)-1)}\left[\sum_{k=-p}^{p}\sum_{l=-p,k\neq l\neq 0}^{p}\mu_{k,l}\right]$$

where p is the row and column and $\mu_{k,l}$ is the mean of the k,l$^{th}$ block in the neighborhood.

12. The computer readable medium set forth in claim 9, wherein determining the contrast ratio is determined by the following relationship:

$$c\_ratio = \frac{|\mu_{rc} - \mu_{pp}|}{\mu_{pp}}$$

where $\mu_{rc}$ is the mean of the given block and $\mu_{pp}$ is the mean of the remaining blocks in the neighborhood.

13. A method for compressing a block of pixel data of an image, comprising:

reading a block of pixel data;

generating a block size assignment based on a local contrast ratio of pixel values of said block of pixel data and neighboring blocks of said block of pixel data;

providing a data structure containing information on said block size assignment;

transforming said the pixel data of selected blocks as indicated by said data structure into a frequency domain;

quantizing said frequency domain data;

scanning said quantized data into a serialized stream of data; and coding said serialized stream of data in preparation for transmission.

14. The method set forth in claim 13, wherein said step of generating futher comprises:

determining a mean for a given block of pixels;

determining a neighborhood mean for blocks of pixels;

determining the local contrast ratio as a function of the mean and the neighborhood mean;

determining a variance threshold as a function of the contrast ratio; and determining sub-block sizes within the block of pixels as a function of the variance threshold.

15. The method set forth in claim 14, wherein the neighborhood mean comprises determining a mean of blocks of pixels adjacent to the given block of pixels.

16. The method set forth in claim 14, wherein determining the neighborhood mean is determined by the following relationship:

$$\mu_{pp} = \frac{1}{((2p+1)\times(2p+1)-1)}\left[\sum_{k=-p}^{p}\sum_{l=-p,k\neq l\neq 0}^{p}\mu_{k,l}\right]$$

where p is the row and column and $\mu_{k,l}$ is the mean of the k,l$^{th}$ block in the neighborhood.

17. The method set forth in claim 14, wherein determining the local contrast ratio is determined by the following relationship:

$$c\_ratio = \frac{|\mu_{rc} - \mu_{pp}|}{\mu_{pp}}$$

where $\mu_{rc}$ is the mean of the given block and $\mu_{pp}$ is the mean of the remaining blocks in the neighborhood.

18. An apparatus for compressing a block of pixel data of an image, comprising:

means for reading a block of pixel data;

means for generating a block size assignment based on a local contrast ratio of pixel values of said block of pixel data and neighboring blocks of said block of pixel data;

means for providing a data structure containing information on said block size assignment;

means for transforming pixel data of selected blocks as indicated by said data structure into a frequency domain;

means for quantizing said frequency domain data;

means for scanning said quantized data into a serialized stream of data; and means for coding said serialized stream of data in preparation for transmission.

19. The apparatus set forth in claim 18, wherein the means for generating further comprises:

means for determining a mean for given block of pixels;

means for determining a neighborhood mean for blocks of pixels;

means for determining the local contrast ratio as a function of the mean and the neighborhood mean;

means for determining a variance threshold as a function of the contrast ratio; and means for determining sub-block sizes within the block of pixels as a function of the variance threshold.

20. The apparatus set forth in claim 19, wherein the means for determining the neighborhood mean comprises means for determining a mean of blocks of pixels adjacent to the given block of pixels.

21. At least one processor configured to perform a method of determining a block size assignment for a given block of pixels, the method comprising:

determining a mean for the given block of pixels;

determining a neighborhood mean for blocks of pixels;

determining a contrast ratio as a function of the mean and the neighborhood mean;

determining a variance threshold as a function of the contrast ratio; and determining sub-block sizes within the block of pixels as a function of the variance threshold.

22. A computer readable medium containing instructions to perform a method for compressing a block of pixel data of an image, the method comprising:

reading a block of pixel data;

generating a block size assignment based on a local contrast ratio of pixel values of said block of pixel data and neighboring blocks of said block of pixel data;

providing a data structure containing information of said block size assignment;

transforming said the pixel data of selected blocks as indicated by said data structure into a frequency domain data;

quantizing said frequency domain data;

scanning said quantized data into a serialized stream of data; and coding said serialized stream of data in preparation for transmission.

23. At least one processor configured to perform a method for compressing a block of pixel data of an image, the method comprising:

reading a block of pixel data;

generating a block size assignment based on a local contrast ratio of pixel values of said block of pixel data and neighboring blocks of said block of pixel data;

providing a data structure containing information on said block size assignment;

transforming said the pixel data of selected blocks as indicated by said data structure into a frequency domain data;

quantizing said frequency domain data;

scanning said quantized data into a serialized stream of data; and coding said serialized stream of data in preparation for transmission.

* * * * *